(12) United States Patent
Mizoguchi

(10) Patent No.: US 10,525,973 B2
(45) Date of Patent: Jan. 7, 2020

(54) VEHICLE TRAVELING CONTROL DEVICE

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 78 days.

(21) Appl. No.: 15/975,458

(22) Filed: May 9, 2018

(65) Prior Publication Data

US 2018/0345953 A1 Dec. 6, 2018

(30) Foreign Application Priority Data

Jun. 6, 2017 (JP) .................................. 2017-111406

(51) Int. Cl.
*B60W 30/045* (2012.01)
*B60W 40/072* (2012.01)
(Continued)

(52) U.S. Cl.
CPC .......... *B60W 30/045* (2013.01); *B60W 30/12* (2013.01); *B60W 40/072* (2013.01);
(Continued)

(58) Field of Classification Search
None
See application file for complete search history.

(56) References Cited

U.S. PATENT DOCUMENTS

| | | | | |
|---|---|---|---|---|
| 4,566,032 A | * | 1/1986 | Hirooka | B66F 9/063 180/168 |
| 6,037,975 A | * | 3/2000 | Aoyama | G01C 21/26 348/113 |

(Continued)

FOREIGN PATENT DOCUMENTS

| | | |
|---|---|---|
| JP | 10-315937 A | 12/1998 |
| JP | 2001-043495 A | 2/2001 |
| JP | 2004-094733 A | 3/2004 |
| JP | 5124415 B2 | 1/2013 |

OTHER PUBLICATIONS

Japanese Office Action issued in corresponding Japanese Patent Application No. 2017-111406, dated Mar. 19, 2019, with English Translation.

*Primary Examiner* — Shelley Chen
(74) *Attorney, Agent, or Firm* — McDermott Will & Emery LLP

(57) ABSTRACT

A vehicle traveling control device includes: a deceleration correction determination unit, a lane detection evaluation unit, a control gain setting unit, and a deceleration control unit. The deceleration correction determination unit acquires information on a curve ahead of a host vehicle and determines on a basis of the curve information whether host vehicle speed deceleration correction is necessary during entry to the curve. The lane detection evaluation unit evaluates a road surface situation of a road prior to the curve entry by a state of detection of a lane ahead of the curve in a case where the deceleration correction is determined necessary. The control gain setting unit sets a control gain of the deceleration correction on a basis of an evaluation value of the lane detection state. The deceleration control unit performs host vehicle speed deceleration control during the curve entry on the basis of the control gain.

7 Claims, 5 Drawing Sheets

(51) Int. Cl.
*B60W 30/12* (2006.01)
*B60W 40/107* (2012.01)
*B60W 50/00* (2006.01)

(52) U.S. Cl.
CPC ... *B60W 40/107* (2013.01); *B60W 2050/0024* (2013.01); *B60W 2550/141* (2013.01)

(56) References Cited

U.S. PATENT DOCUMENTS

| | | | |
|---|---|---|---|
| 6,062,659 A | 5/2000 | Matsuda | |
| 6,278,928 B1* | 8/2001 | Aruga | F16H 59/66 |
| | | | 477/97 |
| 9,230,183 B2* | 1/2016 | Bechtel | B60R 1/04 |
| 9,580,011 B2* | 2/2017 | Bang | B60Q 9/00 |
| 9,802,529 B2* | 10/2017 | Herntrich | B60Q 1/085 |
| 2006/0161331 A1* | 7/2006 | Kumon | B62D 15/026 |
| | | | 701/96 |
| 2009/0153360 A1* | 6/2009 | Kim | B62D 15/025 |
| | | | 340/905 |
| 2012/0277965 A1* | 11/2012 | Takahashi | B60W 30/18145 |
| | | | 701/70 |
| 2013/0131925 A1* | 5/2013 | Isaji | B62D 6/00 |
| | | | 701/41 |
| 2016/0272203 A1* | 9/2016 | Otake | B60W 30/12 |
| 2017/0061797 A1* | 3/2017 | Lee | B60K 31/0008 |
| 2017/0242440 A1* | 8/2017 | Nakada | B62D 15/025 |
| 2018/0134289 A1* | 5/2018 | Kokido | B62D 6/00 |

\* cited by examiner

VEHICLE TRAVELING CONTROL DEVICE

CROSS-REFERENCE TO RELATED APPLICATIONS

The present application claims priority from Japanese Patent Application No. 2017-111406 filed on Jun. 6, 2017, the entire contents of which are hereby incorporated by reference.

BACKGROUND

1. Technical Field

The present invention relates to a vehicle traveling control device performing vehicle speed control during entry to a curve ahead of a host vehicle.

2. Related Art

Nowadays, a technique for controlling a host vehicle for autonomous host vehicle traveling along a target course is being developed as a driving assistance technique including self-driving with regard to vehicles such as automobiles. In a case where the host vehicle travels along a curve ahead during the autonomous traveling along the target course, control for safe curve passage needs to be performed by means of, for instance, vehicle speed deceleration during curve entry.

Japanese Patent No. 5124415, for instance, discloses a technique for performing speed control reflecting an actual curve situation by correcting a target vehicle speed calculated based on curvature information acquired by a navigation device in accordance with a lane width measured by an image recognition device.

SUMMARY OF THE INVENTION

A vehicle traveling control device according to an aspect of the present invention includes a deceleration correction determination unit configured to acquire information on a curve ahead of a host vehicle and determine on a basis of the curve information whether host vehicle speed deceleration correction is necessary during entry to the curve, a lane detection evaluation unit configured to evaluate a road surface situation of a road prior to the curve entry by a state of detection of a lane ahead of the curve in a case where the deceleration correction is determined necessary, a control gain setting unit configured to set a control gain of the deceleration correction on a basis of an evaluation value of the lane detection state, and a deceleration control unit configured to perform host vehicle speed deceleration control during the curve entry on the basis of the control gain.

DETAILED DESCRIPTION

Hereinafter, an example of the present invention will be described with reference to accompanying drawings. Note that the following description is directed to illustrative an example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the disclosure are optional and may be provided on an as-needed basis. The drawings are schematic and are not intended to be drawn to scale.

In a case where a surrounding environment of a host vehicle cannot be sufficiently recognized due to snow cover, dense fog, heavy rain, or the like, it may be difficult realize curve traveling at an appropriate vehicle speed reflecting road surface situations at that time.

It is desirable to provide a vehicle traveling control device with which curve traveling can be performed at an appropriate vehicle speed reflecting road surface situations even in a case where the surrounding environment of a host vehicle cannot be sufficiently recognized.

Figure 1:
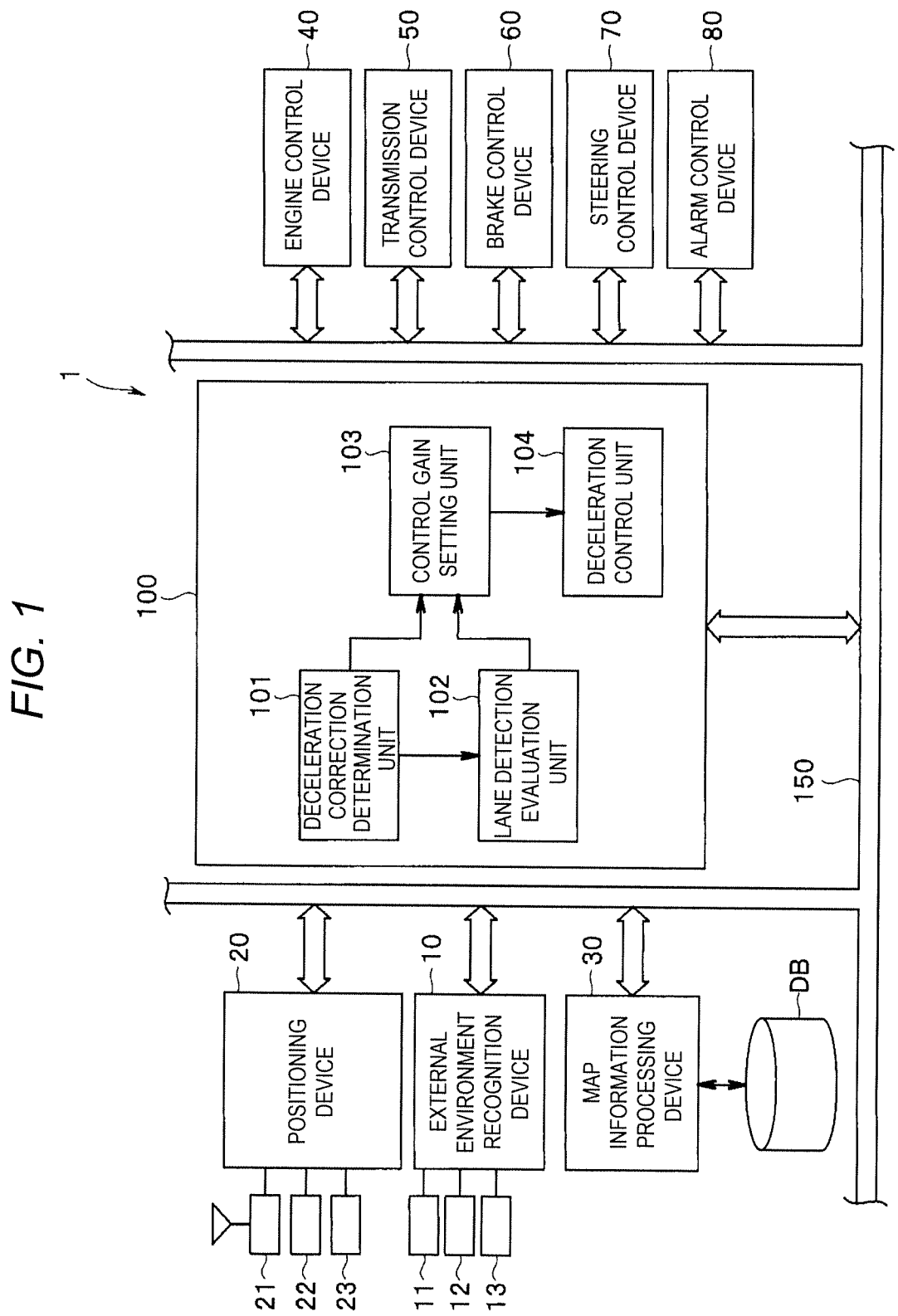
FIG. 1 is a schematic diagram of a traveling control system.

Sign 1 in FIG. 1 indicates a traveling control system for a vehicle such as an automobile, and the traveling control system executes vehicle travel control including autonomous self-driving. This traveling control system 1, which is centered around a traveling control device 100, is configured to be provided with an external environment recognition device 10, a positioning device 20, a map information processing device 30, an engine control device 40, a transmission control device 50, a brake control device 60, a steering control device 70, and an alarm and information presentation control device 80, and each device is network-connected via a communication bus 150.

The external environment recognition device 10 is provided with an onboard camera unit 11, various devices for environment recognition such as a radar device 12 like millimeter-wave radar and laser radar, and various sensors such as an outside air temperature sensor 13 detecting the external temperature as a weather condition regarding the external environment in which a host vehicle travels. The external environment recognition device 10 recognizes the external environment around the host vehicle from, for instance, traffic information acquired by infrastructure communication such as road-to-vehicle communication and vehicle-to-vehicle communication, position information on the host vehicle positioned by the positioning device 20, map information from the map information processing device 30 and so on as well as detection information regarding objects around the host vehicle detected by the camera unit 11, the radar device 12, and so on and environment information such as the external temperature detected by the outside air temperature sensor 13.

In a case where a stereo camera that is divided into two cameras which image the same object from different viewpoints is mounted as the camera unit 11, for instance, the external environment can be three-dimensionally recognized by stereo processing of a pair of left and right images captured by the stereo camera. The camera unit 11 as a stereo camera is configured by, for instance, two shutter-synchronized color cameras that have imaging devices such as CCD and CMOS disposed on the left and right in the vehicle width direction, with a predetermined base line length, and near an inner rear-view mirror in a vehicle cabin upper portion inside the front window.

The pixel shift amount (parallax) of a corresponding position between the pair of right and left images captured by the camera unit 11 as a stereo camera is obtained by matching processing, and a distance image is generated by converting the pixel deviation amount into brightness data or the like. From the principle of triangulation, a point on this distance image is coordinate-converted into a point on a real space in which the vehicle width direction of the host vehicle, that is, the left-right direction is the X-axis, the vehicle height direction is the Y-axis, and the vehicle longitudinal direction, that is, the distance direction is the Z-axis, and then the lane line of the road on which the host vehicle travels, obstacles, vehicles traveling ahead of the host vehicle, and so on are three-dimensionally recognized.

The lane line of the road can be recognized by extracting a point group as a candidate of the lane line from the image and calculating a straight line and a curve connecting the candidate points. For instance, in a lane line detection region set on the image, one set of lane line start point and lane line end point is detected for each search line by detection of an edge at which a brightness changes by a predetermined value or more on a plurality of search lines set in the horizontal direction (vehicle width direction) and the intermediate region between the lane line start point and the lane line end point is extracted as a lane line candidate point.

Then, a model approximating the left and right lane lines is calculated by processing of time series data on the spatial coordinate positions of the lane line candidate points based on the vehicle movement amount per unit time, and the lane line is recognized from this model. An approximate model connecting straight line components obtained by Hough transform and a model approximated by a curve of a quadratic equation or the like can be used as the lane line approximation model.

The positioning device 20 detects the vehicle position of the host vehicle mainly by means of positioning based on signals from a plurality of navigation satellites such as GPS satellites. In a case where the positioning accuracy is deteriorated due to the state of signal (radio wave) capturing from the satellites, the effect of multipath resulting from radio wave reflection, or the like, the positioning device detects the vehicle position of the host vehicle in combination with positioning by autonomous navigation using an in-vehicle sensor such as a gyro sensor 22 and a vehicle speed sensor 23.

During the positioning by means of the navigation satellites, signals including information relating to an orbit, time, and so on and transmitted from the navigation satellites are received via a receiver 21 and the self position of the host vehicle is positioned as an absolute position including a longitude, a latitude, an altitude, and time information based on the received signals. During the positioning by autonomous navigation, the host vehicle position as a relative position change is positioned based on the direction of the host vehicle detected by the gyro sensor 22 and the travel distance of the host vehicle calculated from the vehicle speed pulse output from the vehicle speed sensor 23 or the like.

The positioning device 20 may be integrally provided with a communication unit acquiring traffic information by infrastructure communication such as road-to-vehicle communication and vehicle-to-vehicle communication.

The map information processing device 30 is provided with a map database DB and identifies and outputs a position on the map data of the map database DB from the position data on the host vehicle positioned by the positioning device 20. The map database DB retains, for instance, map data for navigation referred to mainly for vehicle traveling route guiding and vehicle current position display and map data for traveling control more detailed than the map data for navigation and referred to mainly for driving support control including self-driving.

Each of the previous node and the next node is connected via a link with respect to the current node in the map data for navigation, and each link saves information relating to, for instance, the traffic lights, road signs, and buildings installed along roads. The high-definition map data for traveling control, in the meantime, has a plurality of data points between the node and the next node. The data points retain road shape data such as a curvature, a lane width, a road shoulder width of each lane of the road on which the host vehicle travels and data for traveling control such as a road azimuth angle, the number of lanes, a road lane line type, and the like along with attribute data such as a degree of reliability of the data and a data update date.

The map information processing device 30 collates the result of host vehicle positioning and the map data and presents a driver, via a display device (not illustrated), traveling route guide and traffic information based on the result of the collation. In addition, the map information processing device 30 transmits, via the communication bus 150, the road shape data such as the curvature, the lane width, and the road shoulder width of the road on which the host vehicle travels and map information for traveling control such as the number of lanes, the road lane line type, and the road azimuth angle. Although the map information for traveling control is transmitted mainly to the traveling control device 100, the information is transmitted also to the other control devices if necessary.

In addition, the map information processing device 30 performs maintenance management of the map database DB to maintain the latest state at all times by testing the nodes, links, and data points of the map database DB and build a more detailed database by means of new data creation and appending with regard to a no-data region on the database. The data update and new data appending on the map database DB are performed by collation between the position data positioned by the positioning device 20 and the data stored in the map database DB.

The engine control device 40 controls engine (not illustrated) operation states based on signals from various sensors detecting the engine operation states and various types of control information transmitted via the communication bus 150. The engine control device 40 executes engine control mainly including fuel injection control, ignition timing control, opening control for an electronic control throttle valve, and so on based on, for instance, vehicle information such as intake air amount, throttle opening degree, engine coolant temperature, intake air temperature, air-fuel ratio, crank angle, and accelerator opening degree.

The transmission control device 50 controls the hydraulic pressure that is supplied to an automatic transmission (not illustrated) based on signals from various sensors detecting a shift position, the vehicle speed, and so on and various types of control information transmitted via the communication bus 150 and controls the automatic transmission in accordance with transmission characteristics set in advance.

The brake control device 60 controls the brake devices (not illustrated) of four wheels independently of the driver's brake operation based on, for instance, vehicle information such as brake switch, four-wheel speed, steering wheel angle, and yaw rate. In addition, the brake control device 60 calculates the brake hydraulic pressure for each wheel based on the braking force of each wheel and performs antilock brake system and sideslip prevention control and so on.

The steering control device 70 controls steering torque by an electric power steering motor (not illustrated) of a steering system based on vehicle information such as vehicle speed, the driver's steering torque, steering wheel angle, and yaw rate. The steering torque control is executed as current control for the electric power steering motor realizing target steering torque for allowing the actual steering torque to correspond to a target steering angle and, in a case where there is no override by the driver's steering wheel operation, the drive current of the electric power steering motor is controlled by, for instance, PID control.

The alarm and information presentation control device 80 is a device controlling the output of various types of information to be presented to the driver, alarms for calling the driver's attention, and a case where the devices of the vehicle are abnormal. For instance, the alarm and information presentation control device 80 performs warning and information presentation by using one or both of the visual output of a monitor, a display, an alarm lamp, and the like and the acoustic output of a speaker/buzzer, and the like. The alarm and information presentation control device 80 presents the driver the control state during the execution of driving support control including self-driving and, in a case where the driving assistance control including autonomous driving is paused by the driver's operation, notifies the driver of the driving state at that time.

The traveling control device 100 centered around the traveling control system 1 will be described below. When the driver sets a traveling mode of self-driving and driving assistance by operating a switch, a panel, or the like (not illustrated), the traveling control device 100 sets, for instance, a target course from the map database DB in accordance with the driver input so that the host vehicle performs following traveling. Then, the traveling control device 100 executes traveling control via the engine control device 40, the transmission control device 50, the brake control device 60, and the steering control device 70 such that the host vehicle travels along the target course based on, for instance, the external environment recognized information of the external environment recognition device 10 and information and traffic information from the positioning device 20 and the map information processing device 30.

In a case where it is determined based on the information from the positioning device 20 and the map information processing device 30 that a curve is ahead of the host vehicle during the traveling control for the target course, the traveling control device 100 decelerates the curve entry speed so that the host vehicle is capable of safely passing through the curve. At this time, the traveling control device 100 checks the actual road surface situation prior to the curve entry and, even for the curve of the same curvature, changes the vehicle speed and deceleration timing during the curve entry of the curve deceleration control in accordance with the road surface situation detection state. As described later, this control gain change for curve deceleration control, which assumes a worse-than-normal road surface situation, is a change to reduce the vehicle speed from that of the normal curve traveling and reduce the vehicle speed more gently.

Accordingly, the traveling control device 100 is provided with a deceleration correction determination unit 101, a lane detection evaluation unit 102, a control gain setting unit 103, and a deceleration control unit 104 as functional units relating to curve deceleration control. Schematically, in a case where the traveling control device 100 determines by using the functional units that the host vehicle needs to be decelerated while passing through the curve ahead, the traveling control device 100 enables curve traveling at an appropriate vehicle speed by evaluating the host vehicle traveling lane detection state and changing various control gains relating to curve traveling in accordance with the evaluation value.

Specifically, the deceleration correction determination unit 101 acquires information such as the lane width and curvature radius of the curve where the host vehicle enters from the positioning device 20 and the map information processing device 30 and calculates the lateral acceleration during the curve traveling based on the curvature radius of the curve and the curve traveling speed at the current target vehicle speed. Then, the deceleration correction determination unit 101 determines whether vehicle speed deceleration correction prior to the curve entry is necessary by comparing the lateral acceleration at the current target vehicle speed and allowable lateral acceleration set in advance to each other.

The allowable lateral acceleration is set in advance in view of the curvature radius, the lane width, a road gradient of the curve and soon such that curve traveling can be performed at an appropriate vehicle speed at which the driver has no discomfort or anxiety. In a case where the lateral acceleration at the current target vehicle speed exceeds the allowable lateral acceleration, the deceleration correction determination unit 101 determines that vehicle speed deceleration correction prior to curve entry is necessary and notifies the lane detection evaluation unit 102 and the control gain setting unit 103 of the determination. In a case where the lateral acceleration at the current vehicle speed is equal to or less than the allowable lateral acceleration, the deceleration correction determination unit 101 determines that no vehicle speed deceleration correction prior to curve entry is necessary and puts the other functional units relating to curve deceleration control into a standby state.

In a case where the deceleration correction determination unit 101 determines that vehicle speed deceleration correction prior to curve entry is necessary, the lane detection evaluation unit 102 evaluates the road surface situation prior to curve entry by the detection state of the lane ahead of the curve. Then, the lane detection evaluation unit 102 determines, based on the evaluation value of the lane detection state, whether to execute correction for changing the vehicle speed and deceleration timing at curve entry to the deceleration side in comparison to a normal occasion.

Figure 2:
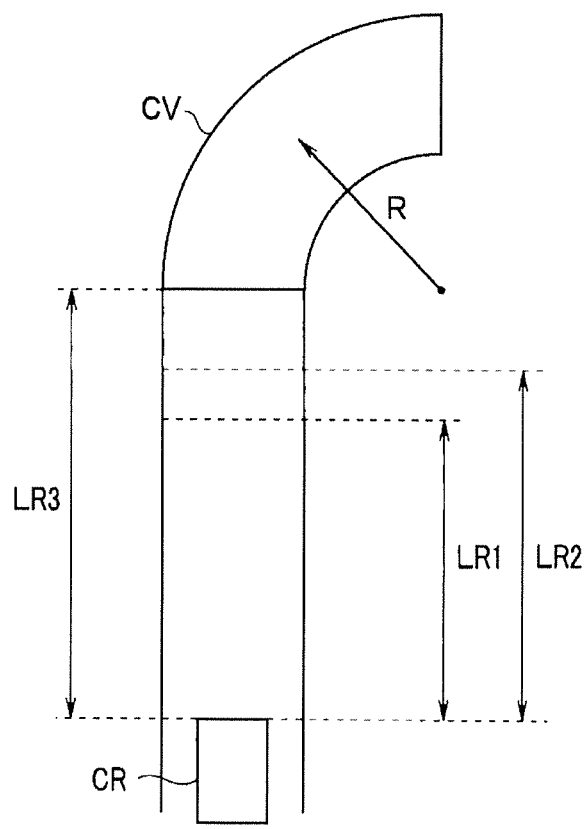
FIG. 2 is an explanatory diagram illustrating a positional relationship between a host vehicle and a curve.

Specifically, the lane detection evaluation unit 102 calculates a lane line detection evaluation value Value_Line by evaluating the detection state of the lane line as a lane by the external environment recognition device 10. For instance, in a case where a host vehicle CR is at the position of a distance LR3 (curve initiation distance LR3) with respect to the initiation position of a curve CV with a radius R as illustrated in FIG. 2, the lane detection evaluation unit 102 calculates the lane line detection evaluation value Value_Line in an evaluation value calculation distance LR1 by using a predetermined distance shorter than a distance LR2 (control initiation distance LR2) from the host vehicle CR to a curve deceleration control initiation position as the evaluation value calculation distance LR1 for evaluation value calculation.

As shown in the following Equation (1), the lane line detection evaluation value Value_Line is calculated as the ratio between the evaluation value calculation distance LR1 and a length LLine of the lane line that could be recognized within the same distance. The lane detection evaluation unit 102 compares the lane line detection evaluation value Value_Line to a threshold PLine set in advance and, in a case where the condition of the following Equation (2) is satisfied, instructs the control gain setting unit 103 to change the curve entry deceleration control gain.

$$\text{Value\_Line} = \text{LLine}/LR1 \tag{1}$$

$$\text{Value\_Line} < \text{PLine} \tag{2}$$

The threshold PLine is a threshold for distinguishing a road surface situation in which the lane line detection state has been reduced and the lane line is recognizable only in part as in traveling on a snow-covered road and in bad weather and, in a case where PLine exceeds Value_Line, it is determined that the curve deceleration control gain needs to be changed with respect to that of normal dry road traveling due to traveling under an adverse, low-road surface friction coefficient, condition. In a case where Value_Line is equal to or greater than PLine, the lane line can be detected in a satisfactory manner and normal dry-road traveling is performed, and thus the lane detection evaluation unit 102 instructs the control gain setting unit 103 to set a normal value as the curve deceleration control gain.

In a case where the condition of Equation (2) is satisfied, the lane detection evaluation unit 102 may reconfirm a change in curve deceleration control in view of the surrounding environment such as the outside air temperature detected by the external temperature sensor 13 and vehicle states such as vehicle heater operation state, wiper operating state, and headlight on/off during daytime hours.

For instance, it can be determined that traveling is performed on a snow-covered road in a case where the condition of Equation (2) is satisfied with the heater in operation due to a low external temperature and traveling is performed under a low-visibility environment attributable to snowstorm, heavy rain, dense fog, or the like in a state where the wiper is in operation with the headlight on even during daytime. Effects of temporary false recognition or the like can be avoided and control reliability can be improved as the curve deceleration control is changed through reconfirmation considering vehicle states and the environment surrounding the host vehicle as described above.

The control gain setting unit 103 changes the curve deceleration control gain in accordance with the lane line detection evaluation value Value_Line. In the present example, the control gain setting unit 103 sets, as the curve deceleration control gain, a vehicle speed correction gain GV for correcting a target vehicle speed VR_TGT at curve entry, a rate limiter correction gain GLimit for correcting a rate limiter PRateLimit regulating a control output change speed, and a control initiation distance correction gain GL for correcting the control initiation distance LR2 (refer to FIG. 2).

In a case where Value_Line is equal to or greater than PLine, the vehicle speed correction gain GV, the rate limiter correction gain GLimit, and the control initiation distance correction gain GL are set such that GV=1.0, GLimit=1.0 and GL=1.0, and the optimum target vehicle speed VR_TGT, the rate limiter PRateLimit, and the control initiation distance LR2 set on the assumption of a normal dry road are used without correction.

Figure 3:
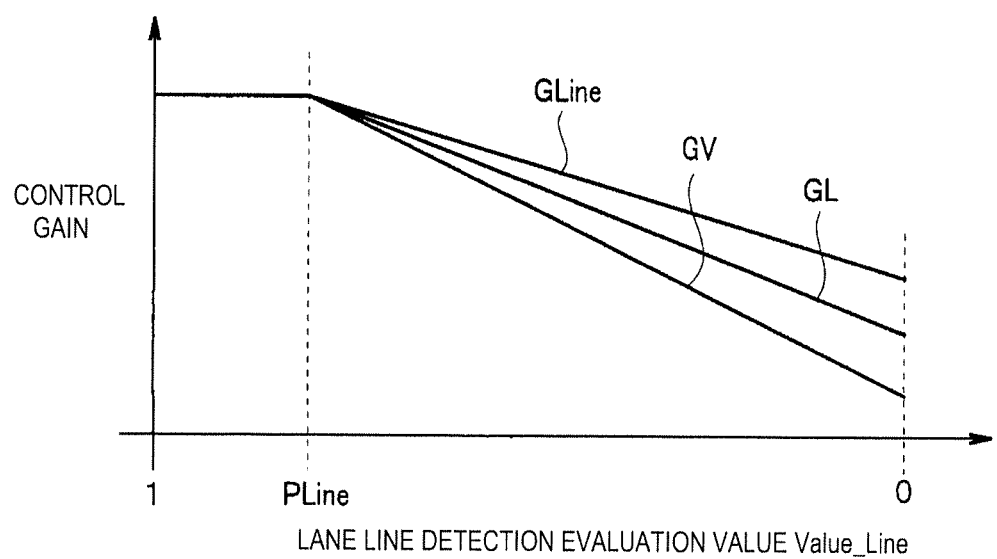
FIG. 3 is an explanatory diagram illustrating a relationship between a lane line detection evaluation value and a control gain.

In a case where PLine exceeds Value_Line, the vehicle speed correction gain GV, the rate limiter correction gain GLimit, and the control initiation distance correction gain GL are changed from normal values as illustrated in FIG. 3 and are set such that the value of each gain decreases as the value of the lane line detection evaluation value Value_Line decreases.

The deceleration control unit 104 controls the timing of control initiation and the vehicle speed at curve entry by using the vehicle speed correction gain GV, the rate limiter correction gain GLimit, and the control initiation distance correction gain GL set by the control gain setting unit 103. Specifically, as shown in the following Equations (3) to (5), the deceleration control unit 104 corrects the normal target vehicle speed VR_TGT, the normal control initiation distance LR2, and the normal rate limiter PRateLimit with respect to the curve with the vehicle speed correction gain GV, the rate limiter correction gain GLimit, and the control initiation distance correction gain GL to calculate a corrected target vehicle speed V'R_TGT, a corrected control initiation distance L'R2, and a corrected rate limiter P'RateLimit.

$$V'R\_TGT = GV \times VR\_TGT \tag{3}$$

$$L'R2 = GL \times LR2 \tag{4}$$

$$P'\text{RateLimit} = G\text{Limit} \times P\text{RateLimit} \tag{5}$$

Figure 4:
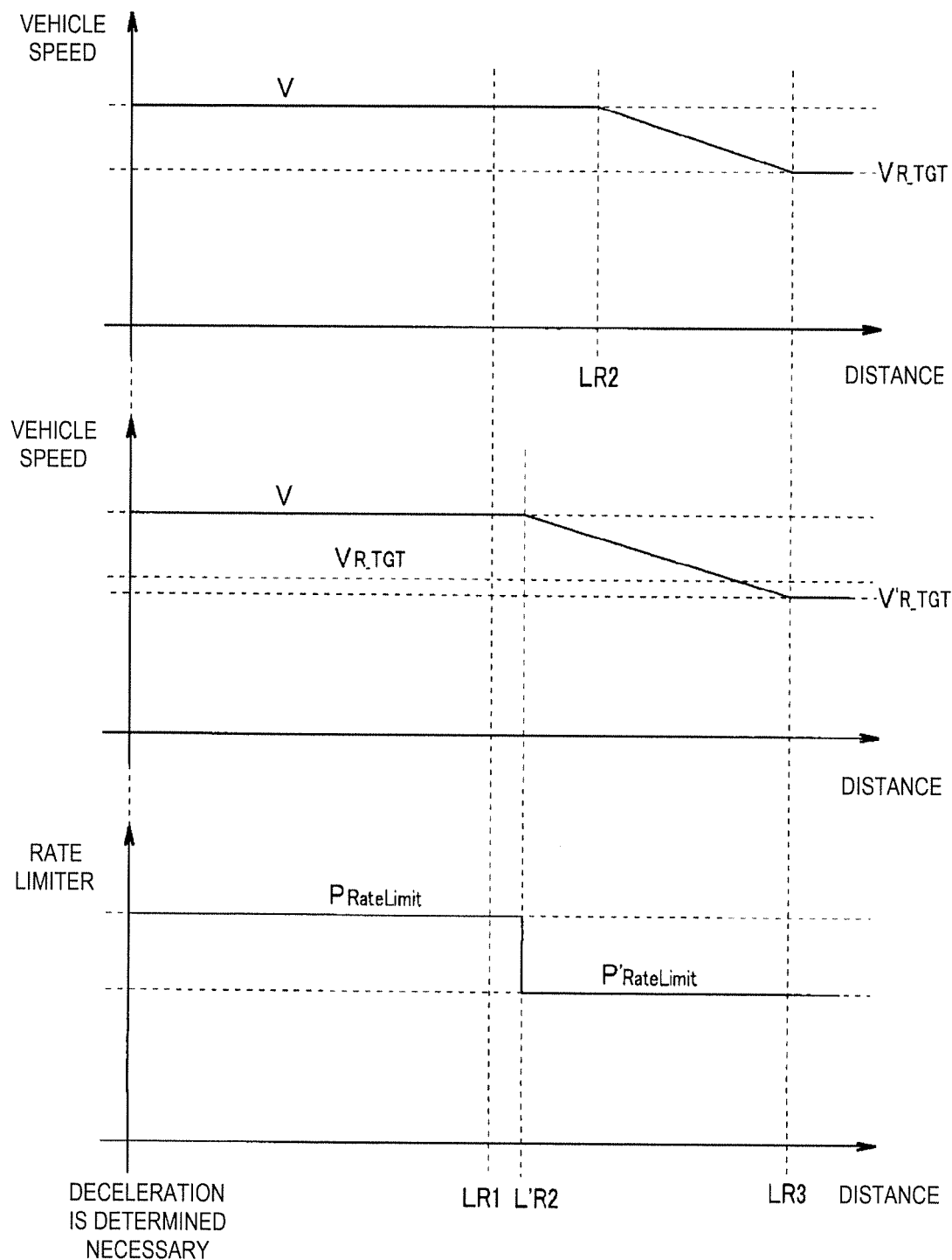
FIG. 4 is an explanatory diagram illustrating a change in vehicle speed during curve entry.

For instance, in a case where it is determined that deceleration is necessary with a curve detected ahead during traveling and the evaluation result at the evaluation value calculation distance LR1 is Value_Line≥PLine, each of GV, GLimit, and GL is 1.0 during normal curve traveling assuming a dry road, and thus deceleration is initiated when the normal control initiation distance LR2 set in advance is reached from the reference point where curve deceleration has been determined necessary as illustrated in FIG. 4. Then, a vehicle speed V is decelerated to the target vehicle speed VR_TGT until the curve initiation distance LR3 is reached from the control initiation distance LR2 and the vehicle speed at curve entry is controlled.

Figure 5:
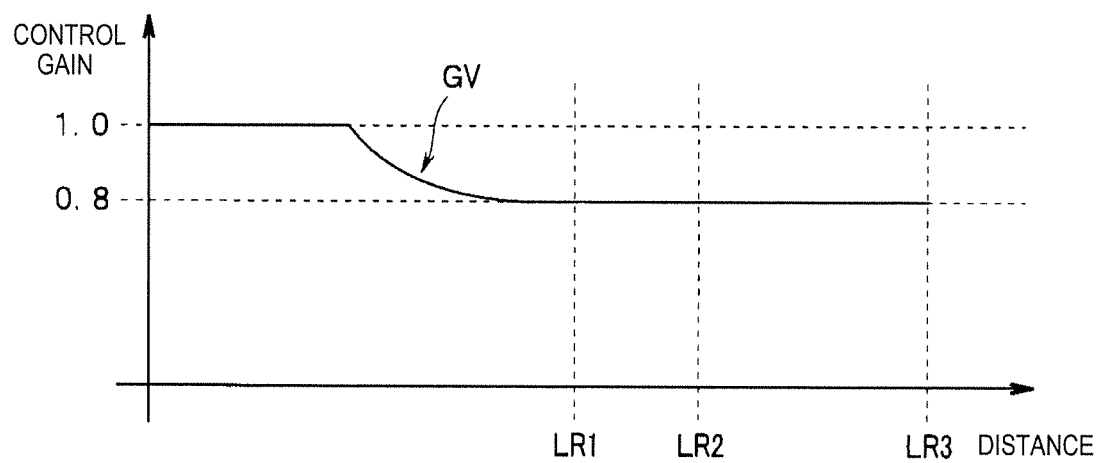
FIG. 5 is an explanatory diagram illustrating a change in vehicle speed correction gain.

In contrast, in a case where it is determined that deceleration is necessary with a curve detected ahead during traveling and the evaluation result at the evaluation value calculation distance LR1 is Value_Line<PLine, the vehicle speed correction gain GV is changed to a value less than the normal value as illustrated in FIG. 5. For instance, the vehicle speed correction gain GV is changed to 0.8 in a case where the vehicle speed correction gain GV at curve entry on a normal dry road is 1.0 and the condition of Value_Line<PLine is satisfied.

In addition, as illustrated in FIG. 4, the control initiation distance LR2 is changed to the shorter-than-normal control initiation distance L'R2 and deceleration is initiated earlier than normal. Then, the vehicle speed V is decelerated to the target vehicle speed V'R_TGT, which is lower than the target vehicle speed VR_TGT at normal curve entry, until the curve initiation distance LR3 is reached from the control initiation distance L'R2 and the vehicle speed at curve entry is controlled. At this time, the rate limiter is also changed to the rate limiter P'RateLimit smaller than the normal rate limiter PRateLimit at the control initiation distance L'R2 and deceleration is more gently performed toward the target vehicle speed V'R_TGT.

Figure 6:
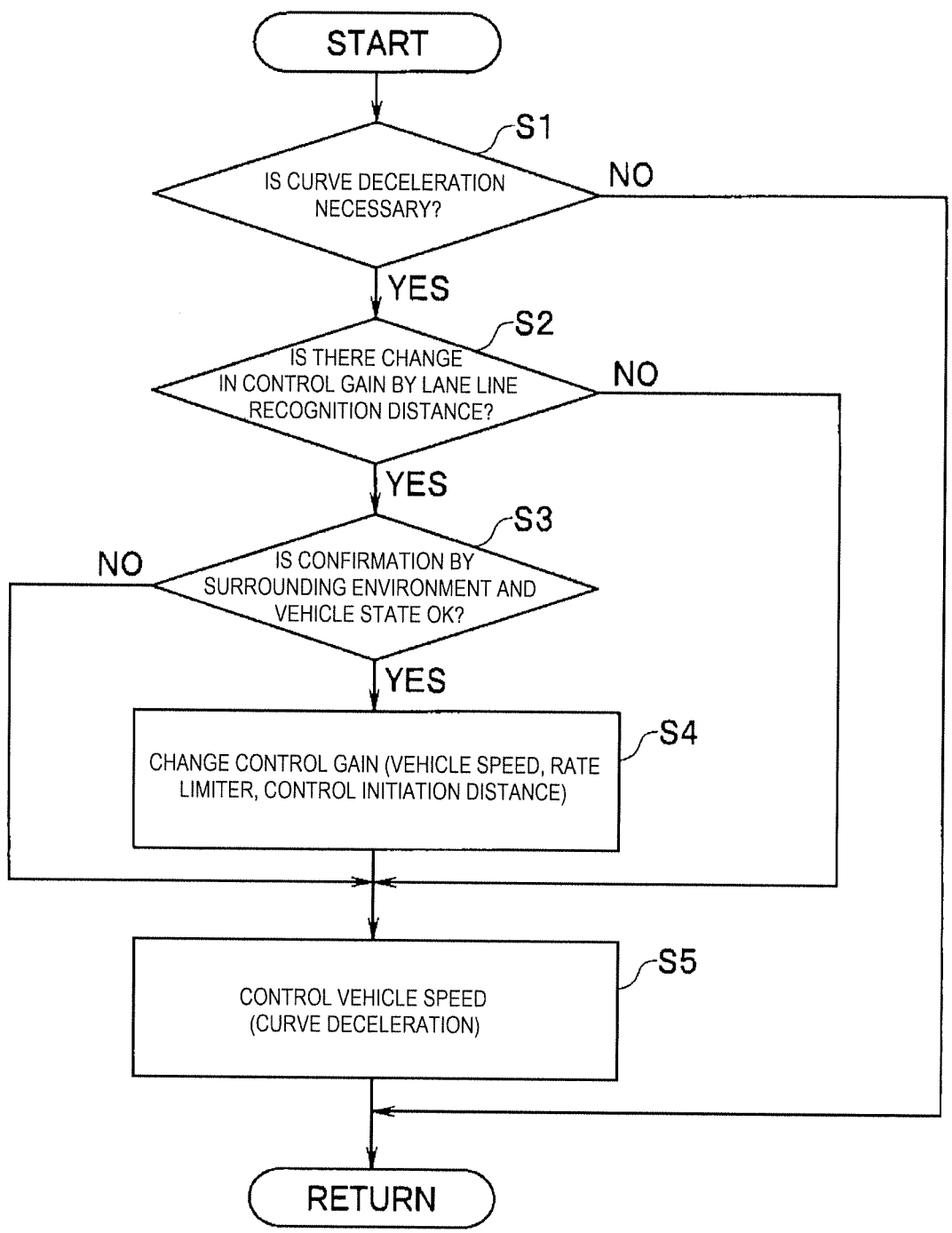
FIG. 6 is a flowchart of curve deceleration control.

Curve deceleration control program processing executed in the traveling control device 100 described above will be described below with reference to the flowchart that is illustrated in FIG. 6.

Once a curve is detected ahead of the host vehicle, in Step S1 as the first step of this curve deceleration control processing, the lateral acceleration at the current vehicle speed is calculated based, for instance, on the curvature radius, the lane width, the road gradient of the curve and so on and it is determined whether deceleration prior to curve entry is necessary. It is determined that deceleration prior to curve entry is unnecessary and this processing is left in a case where the lateral acceleration at the current vehicle speed is equal to or less than the allowable lateral acceleration, and it is determined that deceleration prior to curve entry is necessary and the processing proceeds to Step S2 for curve deceleration control in a case where the lateral acceleration at the current vehicle speed exceeds the allowable lateral acceleration.

In Step S2, the length LLine of the lane line that can be recognized as the lane in which the host vehicle travels is evaluated and it is checked whether there is a change in curve deceleration control gain. In other words, as described above, it is determined whether there is a change in curve deceleration control gain by comparison between the threshold PLine and the lane line detection evaluation value Value_Line calculated as the ratio of the lane line recognition distance to the evaluation value calculation distance LR1.

In a case where Value_Line is equal to or greater than PLine and it is determined in Step S2 that there is no change in control gain, the processing jumps from Step S2 to Step S5 and deceleration control assuming normal curve traveling is executed. During this normal curve deceleration control, the host vehicle is decelerated to the target vehicle speed VR_TGT of curve traveling until the curve initiation distance LR3 is reached from the control initiation distance LR2 and the vehicle speed change is limited not to rapidly change beyond the rate limiter PRateLimit.

In a case where PLine exceeds Value_Line and it is determined in Step S2 that there is a change in control gain, the processing proceeds to Step S2 to Step S3 and reconfirmation with respect to the change in control gain is performed. The processing in this Step S3 is processing for finally confirming whether the change in control gain is OK by the surrounding environment such as the external temperature and vehicle states such as vehicle heater operating state, wiper operating state, and headlight on/off during daytime hours.

The processing proceeds to Step S3 to Step S4 in a case where it is finally confirmed in Step S3 that there is a change in control gain. In a case where the confirmation of whether a change in control gain is necessary has not been made from the surrounding environment and vehicle states, the processing jumps from Step S3 to Step S5 and deceleration control assuming normal curve traveling is executed.

In a case where the processing proceeds from Step S3 to Step S4 based on a final confirmation that a change in control gain is necessary, the vehicle speed correction gain GV, the rate limiter correction gain GLimit, and the control initiation distance correction gain GL are reduced in comparison to those at normal curve entry in accordance with the lane line detection evaluation value Value_Line in Step S4 and, in Step S5, the vehicle speed of the host vehicle is decelerated earlier than during normal curve entry and decelerated to the target vehicle speed V'R_TGT lower than the target vehicle speed VR_TGT at normal curve entry. The rate limiter at this time is changed to the rate limiter P'RateLimit, which is smaller than the normal rate limiter PRateLimit.

As described above, in the present example, the deceleration control gain at curve entry is changed in accordance with the detection state of a lane line ahead of a curve, and thus curve traveling at a more appropriate vehicle speed is possible in response to actual road surface situations depending on snow cover, dense fog, heavy rain, and so on.

In addition, since the road surface situation of the road on which the host vehicle travels is evaluated with the lane line detection state, the actual road surface situation is allowed to match a driver's senses caught as the state of visibility of a white line, and thus curve traveling can be performed at a vehicle speed the driver is comfortable with. Furthermore, since the deceleration control gain at curve entry is changed also in view of the environment surrounding the host vehicle and vehicle states, effects of temporary false recognition or the like can be avoided and control reliability can be improved.

In addition, since the rate limiter is also changed to a lower-than-normal limiter value when the deceleration control gain at curve entry is changed, the target vehicle speed is not rapidly reduced and vehicle wheel slippage caused by rapid deceleration can be prevented even when the driver releases the accelerator after the driver releases autonomous traveling during curve traveling by, for instance, stepping on the accelerator.

According to the present invention, curve traveling can be performed at an appropriate vehicle speed reflecting road surface situations even in a case where the surrounding environment of a host vehicle cannot be sufficiently recognized.

The invention claimed is:

1. A vehicle traveling control device comprising:
 a deceleration correction determination unit configured to acquire information on a curve ahead of a host vehicle and determine on a basis of the curve information whether host vehicle speed deceleration correction is necessary during entry to the curve;
 a lane detection evaluation unit configured to evaluate a road surface situation of a road prior to the curve entry by a state of detection of a lane ahead of the curve in a case where the deceleration correction is determined necessary;
 wherein the lane detection evaluation unit is configured to evaluate the road surface situation by using a ratio between a set distance ahead of the curve and a distance of the lane detected in the set distance as the evaluation value
 a control gain setting unit configured to set a control gain of the deceleration correction on a basis of an evaluation value of the lane detection state; and
 a deceleration control unit configured to perform host vehicle speed deceleration control during the curve entry on the basis of the control gain.

2. The vehicle traveling control device according to claim 1, wherein the control gain setting unit is configured to set a deceleration correction control gain on the basis of the curve information as a normal control gain when the lane detection state evaluation value is equal to or greater than a threshold and change the normal control gain in a direction in which the normal control gain decreases when the lane detection state evaluation value does not reach the threshold.

3. The vehicle traveling control device according to claim 1, wherein the control gain setting unit is configured to set a deceleration correction control gain on the basis of the curve information as a normal control gain when the lane detection state evaluation value is equal to or greater than a threshold and change the normal control gain in a direction in which the normal control gain decreases when the lane detection state evaluation value does not reach the threshold.

4. The vehicle traveling control device according to claim 1, wherein the control gain setting unit is configured to set, as the control gain, a vehicle speed correction gain for correcting a target vehicle speed during the curve entry, a rate limiter correction gain for correcting a rate limiter for the deceleration control, and a control initiation distance correction gain for correcting a distance from a current host vehicle position to a position of initiation of the deceleration control.

5. The vehicle traveling control device according to claim 1, wherein the control gain setting unit is configured to set, as the control gain, a vehicle speed correction gain for correcting a target vehicle speed during the curve entry, a rate limiter correction gain for correcting a rate limiter for the deceleration control, and a control initiation distance correction gain for correcting a distance from a current host vehicle position to a position of initiation of the deceleration control.

6. The vehicle traveling control device according to claim 2, wherein the control gain setting unit is configured to set, as the control gain, a vehicle speed correction gain for correcting a target vehicle speed during the curve entry, a rate limiter correction gain for correcting a rate limiter for the deceleration control, and a control initiation distance correction gain for correcting a distance from a current host vehicle position to a position of initiation of the deceleration control.

7. The vehicle traveling control device according to claim 3, wherein the control gain setting unit is configured to set, as the control gain, a vehicle speed correction gain for correcting a target vehicle speed during the curve entry, a rate limiter correction gain for correcting a rate limiter for the deceleration control, and a control initiation distance correction gain for correcting a distance from a current host vehicle position to a position of initiation of the deceleration control.

* * * * *